United States Patent Office 3,470,591
Patented Oct. 7, 1969

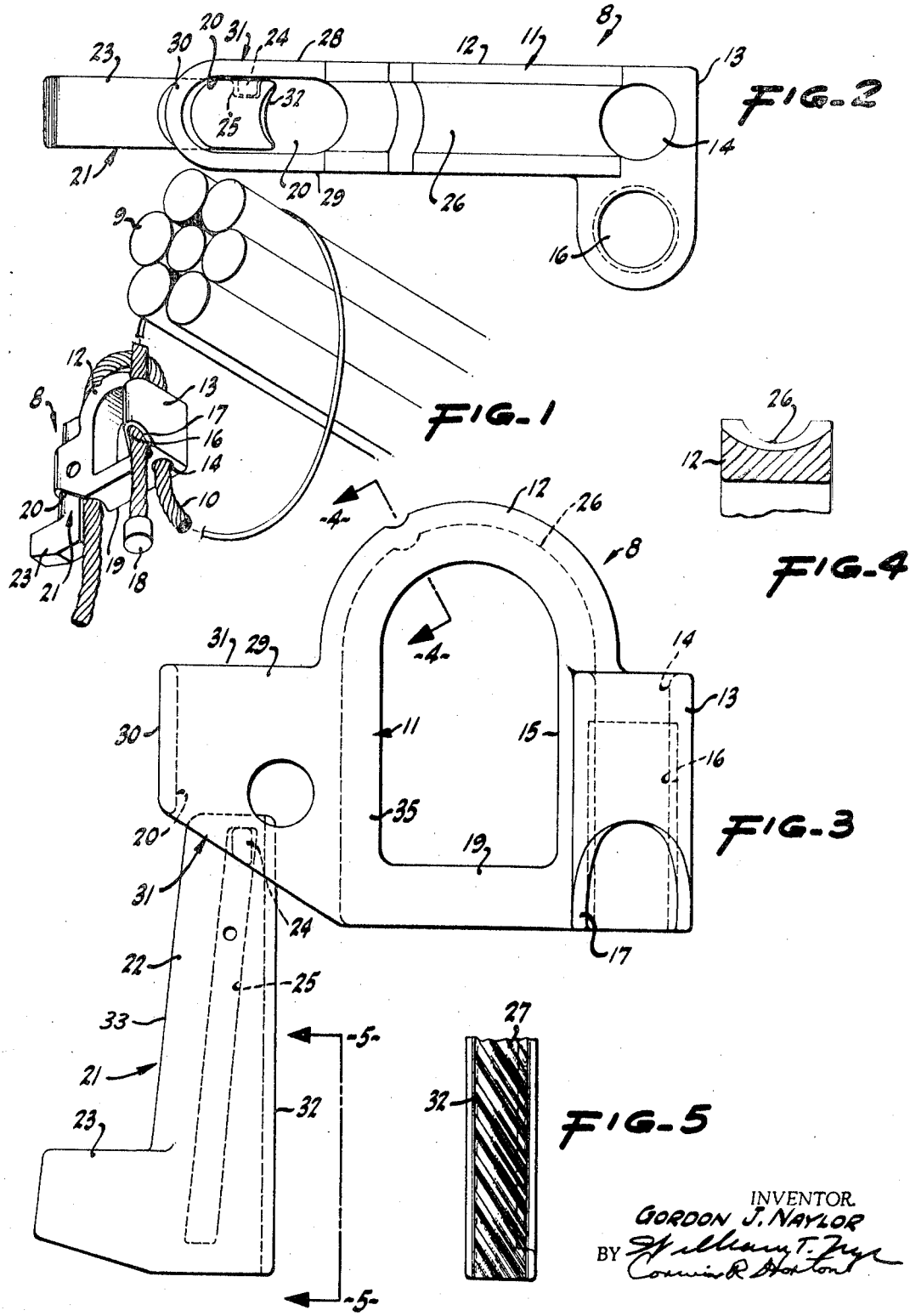

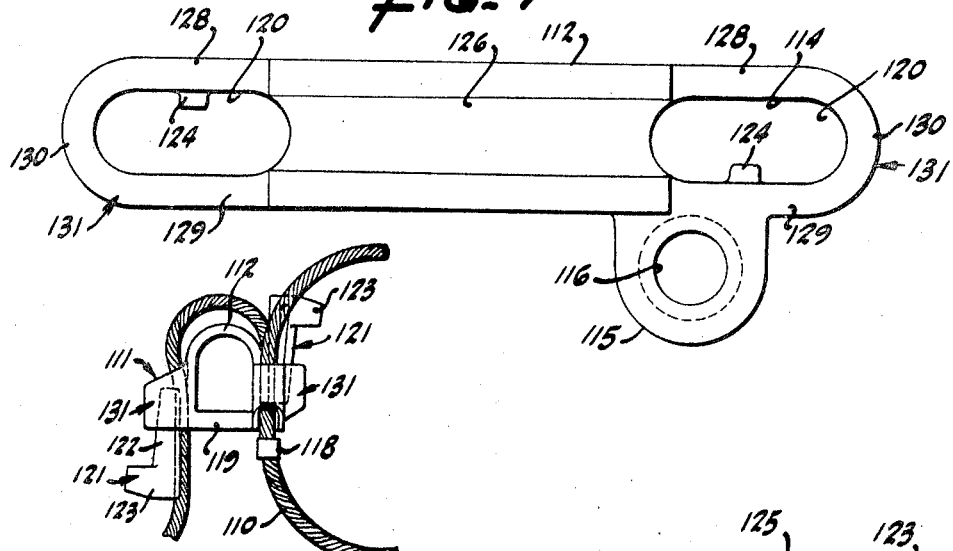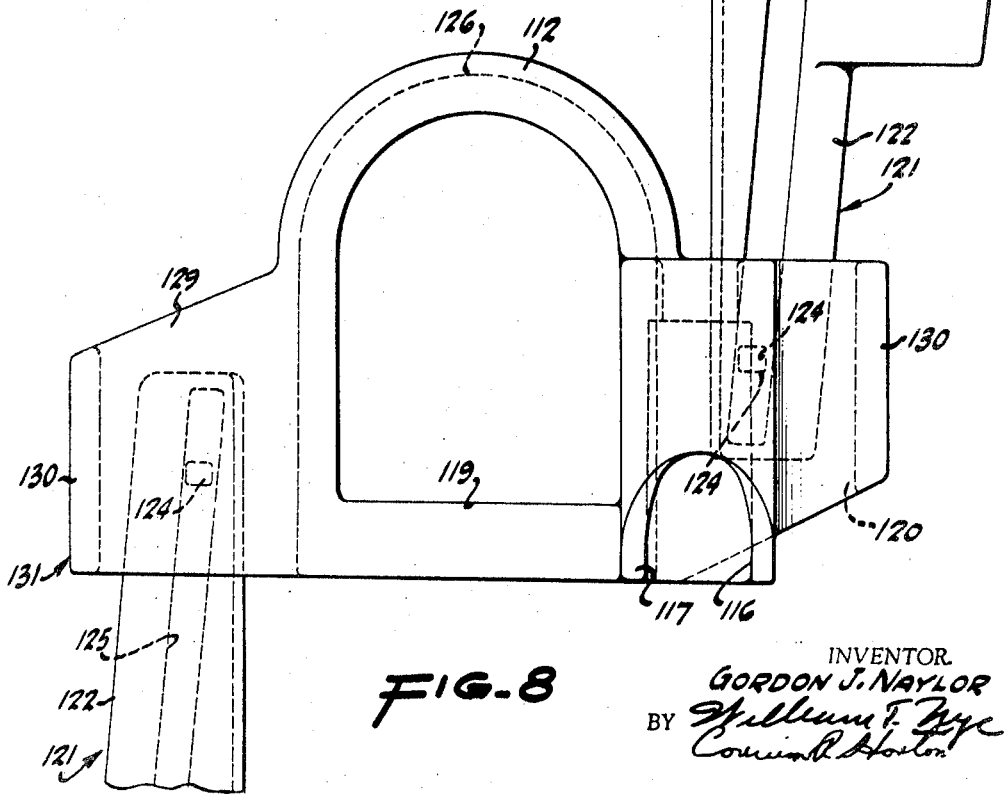

3,470,591
CABLE FASTENER
Gordon J. Naylor, Ladysmith, British Columbia, Canada, assignor to Crown Zellerbach Canada Limited, Vancouver, British Columbia, Canada, a corporation of British Columbia
Filed Aug. 7, 1967, Ser. No. 658,761
Int. Cl. B66c 1/12; B65d 63/08
U.S. Cl. 24—126     1 Claim

ABSTRACT OF THE DISCLOSURE

A cable fastener comprising a U-shaped body member having a keeper-type friction chamber housing integrally connected to one leg and a base integrally connected to the other. The base is provided with a pair of parallel apertures one of which is aligned with the U-shaped body member, and the other offset. A cable is passed through the offset aperture until its ferrule abuts the fastener. The cable is then passed around the logs to be bundled, through the second aperture, around the periphery of the U-shaped member and through the friction chamber housing. The keeper is then driven into the housing to secure the cable.

BACKGROUND OF THE INVENTION

In the paper and lumber industries, it is common for the pulp and saw mills to be at a remote distance from the forests. To transport logs from the forests to the mills, it is common practice to secure several logs together with steel cables to form a raft. The raft is then towed along a waterway to the mill.

In the past when the cables were wrapped around the bundle of logs to form the raft, wood plug bundle wires were used to fasten the ends of the cables together. Those devices were undesirable due to injuries incurred to workmen at the pulp mills during removal of the bundle wires and the high expense associated with one-trip fasteners, i.e., fasteners which must be discarded after being used once.

In light of the apparent need for a suitable replacement, the instant invention was conceived.

Thus, it is an object of this invention to provide a simple and inexpensive multiple-trip log-bundling cable fastener which may be removed from the bundle without danger of injury to the workers removing the fastener.

Other attempts at providing suitable cable fasteners have resulted in fasteners which are frictionally secured to each end of a cable, resulting in many fasteners being dropped in the water and lost when the friction coupling was eased.

Therefore, it is a further object of this invention to provide a cable fastener adapted to be connected to one end of a cable so that it cannot fall free of the cable.

SUMMARY OF THE INVENTION

The invention provides a cable fastener which comprises a U-shaped body member having a cable receiving groove in its periphery. One leg of the U-shaped body member is integrally connected to a base member and the other leg to a friction chamber housing.

The base is provided with a pair of cable receiving apertures, one of which is aligned and registers with the cable receiving groove in the U-shaped body member. The base member at one end of the other aperture is cut away to provide a seat for a ferrule attached to the end of a cable.

The friction chamber housing is provided with a keeper to frictionally engage the cable along its length as it is passed through the chamber thus preventing the cable from slipping with respect to the fastener as tension is applied to the cable.

A length of cable having a ferrule at its end is inserted into the offset aperture in the base and pulled therethrough until the ferrule abuts the base of the fastener. The cable is then wrapped around the logs to be bundled, passed through the second aperture in the base of the fastener, passed around the periphery of the U-shaped member within the cable receiving groove and finally passed through the friction chamber housing. The keeper is then driven into the housing thus securing the cable thereto.

BRIEF DESCRIPTION OF THE DRAWING

FIGURE 1 is a perspective view of my invention shown in conjunction with a bundle of logs.

FIGURE 2 is an end elevation of the preferred embodiment of my invention.

FIGURE 3 is a plan view of the preferred embodiment of my invention.

FIGURE 4 is a sectional view taken on line 4—4 of FIGURE 3.

FIGURE 5 is a fragmentary view of the keeper as taken in the direction of the arrows 5—5 of FIGURE 3.

FIGURE 6 is a schematic view of an alternative embodiment of my invention.

FIGURE 7 is an end elevation of the alternative embodiment of my invention shown in FIGURE 6.

FIGURE 8 is a plan view of the alternative embodiment of my invention shown in FIGURE 6.

DETAILED DESCRIPTION

Referring now to the preferred embodiment of the invention as depicted in FIGURES 1–5 of the drawing, the fastener generally has been designated by reference numeral 8 (see FIG. 1).

Referring now to FIGURE 3, the fastener comprises a frame 11 consisting of a U-shaped body member 12 with supporting strut 19 integrally connected to the end of each leg of U-shaped body member 12. U-shaped body member 12 has been provided with cable receiving groove 26 (see FIG. 2) which extends around its outer periphery for reasons hereinafter described.

Referring now to FIGURE 2, base 13 is integrally connected to one leg of U-shaped body member 12, and has two parallel apertures 14 and 16 extending therethrough. It will be noted that aperture 14 in base 13 registers with cable receiving groove 26 in U-shaped body member 12, the surface of cable receiving groove 26 comprising a portion of the periphery of aperture 14.

Referring again to FIGURE 3, it will be seen that a portion of the base member 13 has been cut away as at 17 in order to provide a seat for the ferruled end of a cable as will be hereinafter explained.

Extending from leg 35 of U-shaped body member 12, is friction chamber housing 31 (see FIG. 2). Housing 31 generally comprises side walls 28 and 29 lying in the same plane as the corresponding side edges of U-shaped body member 12. Side walls 28 and 29 of housing 31 are joined at their outer edges by closure portion 30 integral with each side wall. The inner surfaces of side walls 28 and 29 and closure portion 30 along with the adjacent portion of cable receiving groove 26 in U-shaped member 12 define a friction chamber 20. Extending from the inner surface of side wall 28 into friction chamber 20 is keeper pin 24 for a purpose to be hereinafter described.

Slidable within friction chamber 20 is keeper 21 which comprises tapered body member 22 and an enlarged head 23 integral with the large end of tapered body member 22. Tapered body member 22 comprises a slot 25 along one side for the accommodation of keeper pin 24 in friction chamber 20. As will be noted from FIGURE 3, the slot 25 is provided parallel with the upper surface 33 of tapered body member 22 and converges toward the cable gripping surface 32 at the same angle as does upper surface 33. Therefore, as the keeper is moved into housing 31, gripping surface 32 of keeper 21 will draw nearer the adjacent portion of cable receiving groove 26 and will thus provide a friction coupling with a cable held therebetween.

Referring now to FIGURE 5, it will be seen that the cable gripping surface 32 of keeper 21 has been provided with serrations 27 at an angle to the longitudinal axis of keeper 21 which provides registry with the individual strands of a cable.

When it is desired to bundle logs 9 together in the manner shown in FIGURE 1, cable 10 is passed through aperture 16 in base portion 13 of the cable fastener 8 until the ferruled end of the cable abuts seat 17. The cable is then passed around the logs and through aperture 14 in cable fastener 8. The cable is then looped around the periphery of U-shaped body portion 12 lying in groove 26 in the outer periphery thereof, and passed through friction chamber 20 where it is securely held when keeper 21 is driven into friction chamber 20. The keeper may be driven therein by a hammer or other means applied to the enlarged head 23.

It will be seen as the bundle of logs are jarred about and tend to stretch the cable 10, the wedge member 21 will tend to be pulled or drawn more tightly into the friction chamber 20 due to the friction coupling between keeper 21 and the cable 10, thus applying a greater friction coupling force to the cable. It will also be seen that the U-shaped cable receiving surface of the fastener will provide an added friction coupling with the surface of a cable so fastened.

Referring now to FIGURES 6–8, a modification of the cable fastener is shown.

In this embodiment, a second friction chamber and corresponding keeper means has been substituted for aperture 14 of the preferred embodiment.

As can be seen from FIGURES 6–8, the modification includes U-shaped body member 112 having cable receiving groove 126 around the outer periphery thereof. Extending from each leg of the U-shaped body member 112 in the plane of the side edge thereof, are side walls 128 and 129 of friction chambers 131. The friction chambers are closed at their upper end by closure portion 130 integral with the outer edges of the side walls 128 and 129. The inner surfaces of side walls 128 and 129 and the closure portion 130 along with cable receiving groove 126 lying within the leg of the U-shaped body member 112 adjacent the friction chamber housing, defines a friction chamber 120. Extending inwardly into friction chamber 120 from friction chamber housing side wall 128 is keeper pin 124. Keeper pin 124 registers with slot 125 in the body portion 122 of keeper 121.

Referring now to FIGURE 6, it will be seen that the alternative embodiment of the cable fastener disclosed therein operates much the same way as the preferred embodiment previously described. The cable is passed through aperture 116 in the base portion 115, thence around the several logs to be secured together, through friction chamber 120 most nearly adjacent aperture 116. The cable is then looped around U-shaped body portion 112 and passed through the other friction chamber 120. Both keepers 21 are then driven into the friction chambers, thus providing additional frictional forces to the cable.

When the raft of logs reach the mill and it is desired to release them from the bundle, a workman simply knocks the keeper from the friction chamber with a hammer, thus subjecting the workman to a minimum of danger.

It will be noted also that the fastener cannot fall free of the cable when it is released as the ferrule on the cable acts as a stop. Thus, loss of fasteners are minimized.

It will thus be seen that I have provided a simple and inexpensive means to fasten the ends of cables and the like used for the bundling of logs and other units of like nature which tend to exert tension on the cable as the bundle is manipulated.

It will be understood that various changes in the details, materials, steps and arrangements of parts, which have been herein described and illustrated in order to explain the nature of the invention, may be made by those skilled in the art within the principle and scope of the invention.

I claim;
1. A device for bundling logs or the like, comprising:
   (a) a body member having a U-shaped outer periphery adapted for receiving a cable;
   (b) a base connected to a first leg of said U-shaped body member;
   (c) a seat provided in said base for the accommodation of a ferrule;
   (d) an aperture in said base adjacent said seat, for guiding a cable on to the cable receiving surface of said U-shaped body member;
   (e) a housing connected to a second leg of said U-shaped body member defining a friction chamber adapted to receive a cable;
   (f) a wedge-type keeper mounted for movement in the friction chamber of said housing adapted to be forced against a cable in the friction chamber;
   (g) a cable having a ferrule on one end, the ferrule seated in said seat having its other end portion passed through the aperture in said base around said U-shaped body member and through the friction chamber, the central portion of the cable provided with a loop to surround a bundle of logs.

References Cited

UNITED STATES PATENTS

| | | | |
|---|---|---|---|
| 1,473,144 | 11/1923 | De Caigny | 24—126 |
| 1,562,568 | 11/1925 | Linquist | 24—136 |
| 2,184,466 | 12/1939 | Ost | 24—123.6 |
| 2,958,916 | 11/1960 | Dow | 24—126 |
| 3,350,750 | 11/1967 | Scarr | 24—126 |

FOREIGN PATENTS 421,627  4/1967  Switzerland.

BERNARD A. GELAK, Primary Examiner

U.S. Cl. X.R.

24—123; 687—81